United States Patent
Waters

(10) Patent No.: US 10,152,104 B2
(45) Date of Patent: Dec. 11, 2018

(54) POLICY ENGINE STARTUP PROCEDURE FOR A DEFAULT PROVIDER IN USB POWER DELIVERY

(71) Applicant: TEXAS INSTRUMENTS INCORPORATED, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1215 days.

(21) Appl. No.: 13/918,137

(22) Filed: Jun. 14, 2013

(65) Prior Publication Data

US 2013/0339769 A1  Dec. 19, 2013

Related U.S. Application Data

(60) Provisional application No. 61/660,476, filed on Jun. 15, 2012.

(51) Int. Cl.
*G06F 1/32* (2006.01)
*G06F 1/26* (2006.01)
*G06F 1/30* (2006.01)

(52) U.S. Cl.
CPC ............. *G06F 1/266* (2013.01); *G06F 1/305* (2013.01); *G06F 1/3296* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
USPC .......................................... 713/300, 310, 320
See application file for complete search history.

(56) References Cited

U.S. PATENT DOCUMENTS

| | | | |
|---|---|---|---|
| 7,447,922 B1* | 11/2008 | Asbury et al. ................. | 713/300 |
| 2005/0222933 A1* | 10/2005 | Wesby ............................ | 705/36 |
| 2006/0224791 A1* | 10/2006 | Keppeler ........................ | 710/62 |
| 2007/0050646 A1* | 3/2007 | Conroy et al. ................ | 713/300 |
| 2007/0276971 A1* | 11/2007 | Croyle .......................... | 710/100 |
| 2010/0064153 A1* | 3/2010 | Gk et al. ....................... | 713/310 |
| 2010/0225176 A1* | 9/2010 | Bhargava et al. ............. | 307/125 |
| 2011/0016333 A1* | 1/2011 | Scott et al. ................... | 713/300 |
| 2013/0159560 A1* | 6/2013 | Cave et al. ...................... | 710/19 |
| 2013/0238920 A1* | 9/2013 | Harris ............................ | 713/323 |
| 2013/0275640 A1* | 10/2013 | Wang et al. .................. | 710/300 |
| 2013/0332172 A1* | 12/2013 | Prakash et al. ............ | 704/270.1 |

* cited by examiner

*Primary Examiner* — Zahid Choudhury
(74) *Attorney, Agent, or Firm* — Michael A. Davis, Jr.; Charles A. Brill; Frank D. Cimino

(57) ABSTRACT

An electronic device including a universal serial bus power delivery (USB-PD) port for at least the delivery of power, and a USB-PD controller to control a state of power delivery by the USB-PD port out of a plurality of states, wherein the USB-PD controller transitions the USB-PD port from an unpowered state to a check internal power state when the USB-PD port is ready to power the USB cable.

10 Claims, 2 Drawing Sheets

POLICY ENGINE STARTUP PROCEDURE FOR A DEFAULT PROVIDER IN USB POWER DELIVERY

CROSS-REFERENCE TO RELATED APPLICATION

The present application claims priority to U.S. Provisional Patent Application No. 61/660,476, filed on Jun. 15, 2012; which is hereby incorporated herein by reference.

BACKGROUND

Universal Serial Bus (USB) technology has been ubiquitous for quite some time but its use has begun to morph from one of mainly delivering data to one of mainly delivering power. At least one evolutionary node of it is more focused on the delivery of power. Originally, USB protocol and USB ports were mainly used to transfer data between devices along with a little bit of power. However, with increase of devices mainly using USB ports for delivering and receiving power along with a little bit of data, or bursts of data, the protocol governing the exchange has been rewritten. The new standard, termed USB power delivery (USB-PD) defines the protocol when using USB to power a variety of devices, the communication between the devices over the power delivery cable, and allows for the delivery of powers ranging up to 100 Watts. The new protocol, however, may become stuck in a low power state in certain situations when no external signal is being applied to the USB cable.

SUMMARY

The problem noted above are solved in large part by an electronic device including a universal serial bus power delivery (USB-PD) port for at least the delivery of power, and a USB-PD controller to control a state of power delivery by the USB-PD port out of a plurality of states, wherein the USB-PD controller transitions the USB-PD port from an unpowered state to a check internal power state when the USB-PD port is ready to power the USB cable.

Another embodiment to solve the problem may be a system to manage operational states of a Universal Serial Bus Power Delivery (USB-PD) port including an electronic device comprising a USB-PD port, a device policy manager and a battery, wherein the USB-PD port is at least to deliver power via a USB cable to an external device and is coupled to the device policy manager and the battery. The USB-PD port further comprising a policy engine to control a state the USB-PD port is in and to control the delivery of power, wherein the policy engine, when the USB-PD port is in an unpowered state, is to determine whether the USB-PD port is ready to power the USB cable, and based on the determination that the USB-PD port is ready to power the USB cable, the policy engine is to transition the USB port into a check internal power state.

Yet another embodiment is a method for removing a Universal Serial Bus Power Delivery (USB-PD) port from an unpowered state including determining, by a policy engine, that a USB-PD port has transitioned into an unpowered state, determining, by the policy engine, whether the USB-PD port is ready to deliver power, and transitioning, by the policy engine, the USB-PD port into a check internal power state when it is determined that the USB-PD port is ready to deliver power.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
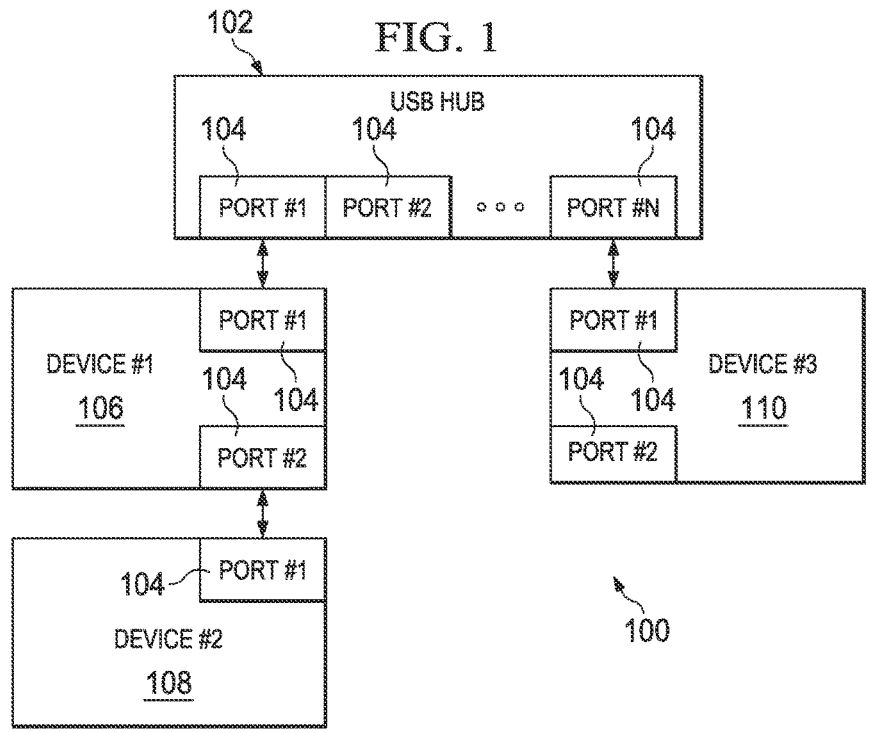
FIG. 1 shows a USB-PD system 100 in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The new USB-PD protocol addresses the emergence of using USB ports primarily for power delivery along with some data transfer instead of primarily for data transfer along with some power delivery. USB ports have become one of the go-to technologies for interconnecting multiple devices, such as monitors, speakers, and pointing devices to laptop computers, connecting mobile devices to computers, etc. The USB port offers a flexible platform for such connectivity. Due to this increased use, the USB-PD protocol was drafted to enable devices to communicate over the power delivery wire, $V_{BUS}$, and to negotiate the delivery of various or alternative amounts of power rather than the default. Low power headphones may be plugged into a laptop via a USB-PD port and negotiation may ensue so that the headphones receive only the power needed, which may be a lower power than normally delivered. On the other end of the power spectrum, a monitor may be plugged in that requires close to 100 Watts, which is available for delivery under the USB-PD protocol.

A USB-PD port, also simply referred to as a port herein, may be either a provider/consumer (P/C) or a consumer/ provider (C/P). When in the provider (P) role, the port is delivering power, and when in the consumer (C) role the port is sinking power. Under the USB-PD protocol, the communication between the two devices takes place over the $V_{BUS}$ line of the USB cable connecting the two devices. As such, each port has its own transmitter and receiver so the devices can communicate across $V_{BUS}$ without using any of the data lines of the USB cable. As such, two USB-PD devices may negotiate power delivery requirements and even switch from being a P to being a C over the $V_{BUS}$ line. The communication between the devices may be half-duplex and packet based and may use frequency-shift keying (FSK) to modulate the transmissions.

Additionally, the USB-PD protocol may govern the various states or conditions in which the port operates. The protocol may define start up procedures, default operating conditions and responses to changes of the port's operation due to external actions. For example, at system startup, the USB-PD protocol may direct the port to reset a protocol layer, run through various other functions, then transition to a default state as a source port supplying five volts on $V_{BUS}$. The port may remain in that state or respond to internal or external requests if a USB cable and an external USB-PD enabled device is connected. The state the port is in, as such, may periodically change and the change of state may be controlled by a port controller.

In an earlier version of the USB-PD standard, the state of the port was to transition from an unpowered port state to the check internal power state if and only if a vSafeDB voltage was imposed on $V_{BUS}$ from an external USB-PD enabled device. This condition, however, may lead to the port being stuck in the unpowered port state if the vSafeDB condition is not satisfied. For example, if the P/C has a cable plugged in without any device connected to the far-end of the cable, its controller may be in an other functions state. Eventually, the battery of the P/C may lose power and stop sourcing 5V on $V_{BUS}$ or it may simply choose to save power and stop sourcing 5V on $V_{BUS}$. In some applications the controller may continue to operate even though it is unable to source 5V—in this case the controller may move into the unpowered port state. While in the unpowered port state the P/C device may regain the ability to source 5V on $V_{BUS}$, but the controller may remian in the unpowered port state unless it receives a USB-PD message or if the external device applies vSafeDB to $V_{BUS}$. Neither of these exit conditions may occur if a C/P that is not USB-PD capable is attached. Further, not all USB-PD devices may transmit a message in this situation either.

Disclosed herein is a method, device, and system to transition a USB-PD device out of an unpowered state into a check internal power state by determining if an external device is applying vSafeDB voltage to the $V_{BUS}$ line or if the USB-PD port is ready to power $V_{BUS}$. Whether or not the USB-PD port is ready to power $V_{BUS}$ may be communicated to a policy engine governing the USB-PD port from a device policy manager associated with the device containing the port.

FIG. 1 shows a USB-PD system 100 in accordance with various examples as discussed herein. The system 100 includes a USB hub 102, a device 106, a device 108 and a device 110. The USB hub 102 may include ports 104 #1 through #N, and each of the devices 106-110 may have at least one port 104. Each of the ports 104 associated with the USB hub 102 and the devices 106-110 may either be a P or C at any given time depending on negotiations that take place when an external USB-PD enabled device is connected via a USB cable. For example, the Port 104 #1 of the USB hub 102 may be a P/C and may be connected to the device 106's port 104 #1, which may be a C/P. Further, the device 106's port 104 #2 may be a P/C and may be connected to the device 108's port 104, which may be a C/P. Thus, the device 106 may have one port 104 designated a C/P (port 104 #1) and a second port 104 designated as a P/C (port 104 #2). It could have other ports designated as P or C as well, those ports would not have the capability to swap roles from source to sink or vice versa, though.

When two USB-PD enabled devices are connected via a USB cable, the devices may be able to communicate with one another via the $V_{BUS}$ wire of the USB cable to negotiate power requirements and to designate one port as a provider (P), the other port as a consumer (C). Communication may occur between the P and C concerning the delivery of a level of power. Since the transmissions occur on the $V_{BUS}$ wire, the other data wires of the USB cable may be reserved for the transmission of other data unaffected by the USB-PD communication on the power wire, and the possibility of collisions is eliminated. Dedicating $V_{BUS}$ for both power and communication separates the power concerns from the data transmissions. The control and communication may originate from a controller associated with each port 104.

Figure 2:
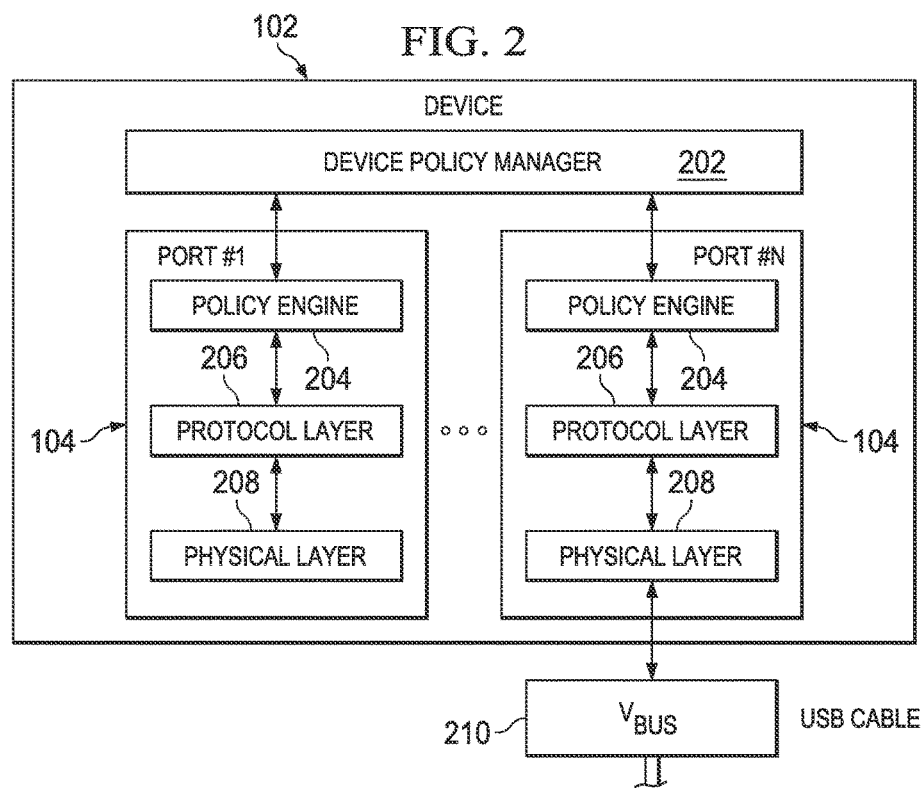
FIG. 2 shows a block diagram of a device in accordance with various examples.

FIG. 2 shows a block diagram of a device 102 in accordance with various examples as discussed herein. The device 102 may be the USB hub 102 and may include a plurality of ports 104 numbered #1 through #N. Each of the ports 104 may be a USB-PD enabled port and may include a policy engine 204, a protocol layer 206, and a physical layer 208. The policy engine 204, the protocol layer 206 and the physical layer 208 may comprise the controller for the port 104. The device 102 may further include a device policy manager 202. The port 104 #N of the device 102 may be connected to an external device (not shown) through the USB cable 210, which may have at least one wire within designated as the $V_{BUS}$ line for the delivery of power between the devices and the transmission of USB-PD communications. The device 102 of FIG. 2 may also correspond to device 106 (N=2), device 108 (N=1) or device 110 (N=2).

The device policy manager 202 may contain information concerning the parameters of the device 102, such as capabilities for sourcing and sinking power. The device policy manager may communicate with the policy engine 204 regarding the policy engine's port 104 power delivery/sinking capabilities. The protocol layer 206 may control the flow of messages between the policy engines 206 of two connected devices such as the device 102 and the external device (not shown) connected via the USB cable 210. The actual transmission and reception of the messages may be controlled by the physical layer 208 associated with each port. The policy engine 204, the protocol layer 206 and the physical layer 208 of each port 104 may only be concerned with the delivery of power and the communication of power negotiations via the $V_{BUS}$ and the ground wire connected to their associated port 104. The other lines of the USB cable 210 associated with the transmission and reception of data may have their own components for the management of the data transmissions.

The policy engine 204 may govern the modes and transitions between modes of the P/C port 104. For example, at startup the policy engine may direct the P/C port 104 to reset the protocol layer then cycle through other start up functions such as supply a default voltage to the $V_{BUS}$. If an external device is attached, the policy engine 204 may begin communicating with the policy engine of the external device to determine which port may be the P and which may be the C. The amount of power delivered may also be negotiated between the policy engines.

If the device 102 is operating on battery power, the device 102 may occasionally power down due to the battery getting low. In this scenario, the P/C port 104 may transition into an unpowered state and stop delivering power to the external device. If a user of the device 102 subsequently restores power, then the P/C port 104 may be able to continue to deliver power. Waking the P/C port 104 up, however, may require either the device policy manager 202 sending a signal to the policy engine 204 or the external device applying the vSafeDB voltage to the $V_{BUS}$. The vSafeDB voltage may only be applied by a C/P and may range from 4.75 V to 5.25 V. The application of vSafeDB by the external device may be one mechanism to wake up the policy engine 204 associated with the P/C port 104. However, there may be times when the P/C port 104 is not connected to an external device, just a floating USB cable, or the external device is not USB-PD enabled. In either instance, vSafeDB may not be applied to the $V_{BUS}$. Further, if the device policy manager 202 fails to wake up the P/C port 104, then the policy manager 204 may become stuck in the unpowered state. Unless the device 102 is completely shut down, the policy engine 204 may keep the P/C port 104 in the unpowered state.

Figure 3:
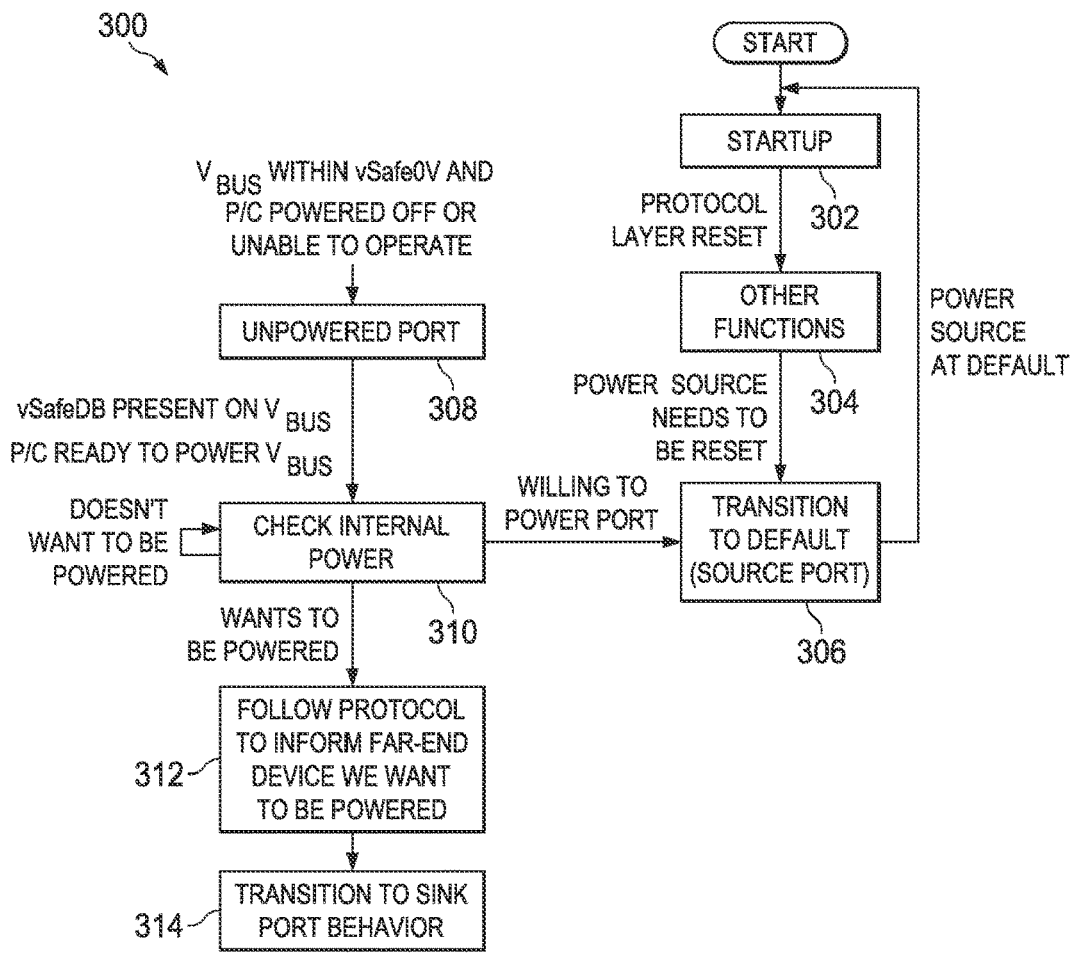
FIG. 3 is an example state diagram of a policy engine in accordance with various examples.

FIG. 3 is an example state diagram 300 of a policy engine 204 in accordance with various examples as discussed herein. The state diagram 300 may begin at startup state 302 when the device 102 and the P/C port 104 are turned on. During the startup state 302, the policy engine 204 may reset the protocol layer 206 before transitioning into other functions state 304. While in the other functions state 304 the policy engine 204 may communicate with the policy engine of an externally connected USB-PD enabled device, the policy engine 204 may communicate with the device policy manager 202, and/or the policy engine 204 may alter the power supplied via the port 104 due to instructions received from the device policy manager 202. The functions associated with the other functions state 304 may enable the P/C port 104 to increase the voltage and/or current it provides to a C/P. In the course of carrying out these other functions, events may occur that require the P/C port 104 to be reset to its default state of providing 5V, by transitioning the P/C port 104 to default state 306, on the $V_{BUS}$. Once the P/C port 104 is at the default value of 5V the policy engine 204 may return to the startup state 302.

At any point in the state diagram 300, an event may occur that causes the P/C policy engine 204 to transition the P/C port 104 into an unpowered port state 308. These events are cases where the P/C policy engine 204 is unable or unwilling to return to the default state 306 of providing 5V on the $V_{BUS}$ or to continue in its current state. For example, the policy engine 204 may transition into the unpowered port state 308 when $V_{BUS}$ is within vSafe0V, which may be less than 0.5V and may be a lower threshold voltage indicating the P/C port 104 is no longer delivering power, and the P/C is either powered off or is unable to operate. A P/C port 104 that is unable to operate may be a port that has been powered down by the device policy manager 202 to conserve energy, for example. As such, the policy engine 204 of the P/C port 104 may be stuck in the unpowered port state 308. An additional condition may be added to the state diagram 300 to remove the policy engine 204 out of the unpowered port state 308 when it becomes trapped in that state.

The P/C port 104 of the device 102 may transition out of the unpowered port state 308 due to the satisfaction of one of two conditions. One, if the P/C port 104 is connected to an USB-PD enabled external device via an USB cable, then the external device may place vSafeDB volts on the $V_{BUS}$. The external device may only place the vSafeDB voltage on the $V_{BUS}$ after the power delivered by the P/C port 104 has dropped to and remained at zero volts for a short period of time, which may indicate a dead battery. The application of the vSafeDB by the C/P may be a signal/test to determine if the P/C is still able to provide power. If the P/C port 104 is functioning and receives the vSafeDB voltage, then the policy engine 204 may transition the P/C port 104 into the check internal power state 310.

Second, if the policy engine 204 is informed by the device policy manager 202 that the P/C port 104 is ready to power $V_{BUS}$, then the policy engine 204 may transition the P/C port 104 into the check internal power state 310. Additionally or alternatively, the P/C port 104 may also receive a message from the device policy manager 202 to prompt the policy engine 202 to transition the P/C port 104 out of the unpowered port state 308. This path, however, may not be initiated or provoked by the policy engine 204 and may occur outside of the state diagram 300.

Once the policy engine has transitioned to the check internal power state 310, the policy engine 202 may test a series of conditions to determine into which state to further transition the P/C port 104. The policy engine 204 may determine if the P/C port 104 is to provide/deliver power. If so, then the policy engine 204 may transition the P/C port 104 into the default state 306. If the P/C port is not to provide power, then the policy engine 202 may determine if the P/C port 104 is to receive power from an external device. In this state, the P/C port 104 may become a power sink or a C/P. If the P/C port 104 is to become a sink, then the policy engine 204 may transition to the sink port behavior state 314 via the sink protocol state 312. The sink protocol state 312 may have the policy engine follow protocol to inform the external device that the P/C port 104 requests to be powered.

If the P/C port 104 is not to become a provider or a consumer, then the policy engine 204 may stay in the check internal power state 310. While in the check internal power state 310, the policy engine 204 may continuously or periodically evaluate the conditions regarding being a sink or provider in order to move the P/C port 104 into the desired state. The device policy manager 202 may also send a message to the policy engine 204 to move the P/C port 104 into one of the other desired states at any time. Alternatively, the policy engine 204 may transition the P/C port 104 back into the unpowered port state 308 if the policy engine 204 determines that the P/C port 104 is to neither provide nor sink power. By transitioning the P/C port 104 back into the unpowered port state 308, the policy engine 204 may be conserving power instead of indiscriminately providing default power to the port.

As an alternative to the startup state 302 beginning with resetting the policy layer 206, the policy engine 204 may initialize the P/C port 104 by first determining if the port is ready to be powered or if vSafeDB is present on the $V_{BUS}$. If either of these conditions is satisfied, then the policy manager 204 may transition the port into the check internal power stat 310 and then continue with the determinations that occur in that state. Else, the policy engine 204 may transition the P/C port 104 into the unpowered port state 308 to conserve power.

Figure 4:
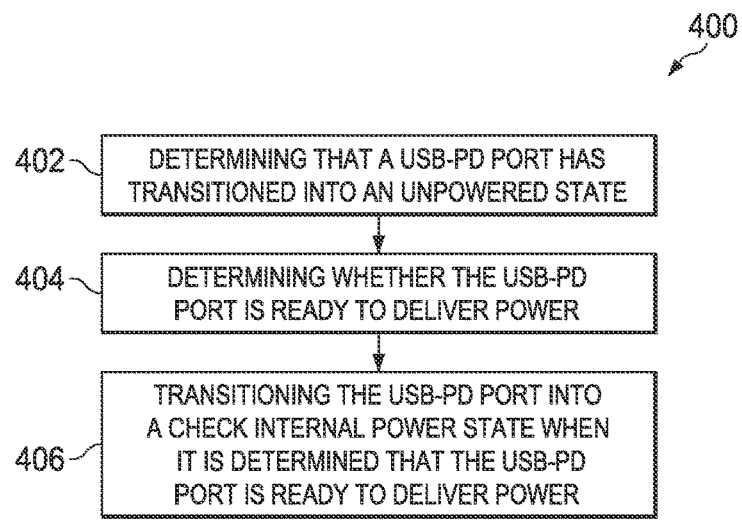
FIG. 4 is a flow chart of an example method for transitioning the policy engine into the check internal power state from the unpowered port state in accordance with various examples.

FIG. 4 is a flow chart of an example method 400 for transitioning the policy engine 204 into the check internal power state 310 from the unpowered port state 308 in accordance with various examples as discussed herein. The method 400 begins at step 402 with determining that a USB-PD port has transitioned into an unpowered state. The policy engine 204 may determine that the P/C port 104 has transitioned into the unpowered port state 308 when the voltage being applied to the $V_{BUS}$ has dropped to below 0.5V, vSafe0V, and either the P/C port 104 is powered off or the P/C port 104 is unable to operate.

The method 400 continues at step 404 with determining whether the USB-PD port is ready to deliver power. The determination of whether the P/C port 104 is ready to deliver power may be based on communications received by the policy engine 204 from the device policy manager 202 regarding the state of the device 102 or the P/C port 104. Alternatively, the policy engine 204 may prompt the device policy manager 202 to determine whether the P/C port 104 is ready to deliver power.

The method 400 continues at step 406 with transitioning the USB-PD port into a check internal power state when it is determined that the USB-PD port is ready to deliver power. The policy engine 204 may transition the P/C port 104 into the check internal power state 310 when it has determined that the P/C port 104 is ready to deliver power. Alternatively, the policy engine 204 may transition the P/C port 104 into the check internal power state 310 when it has determined that vSafeDB voltage is present on the $V_{BUS}$ from an external device connected to the P/C port 104 via the USB cable 210. Once the P/C port 104 is in the check internal power state 310, the policy engine 204 may continue to make determination regarding the next state in which to transition.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system to manage operational states of a Universal Serial Bus Power Delivery (USB-PD) port, comprising:
    an electronic device comprising a USB-PD port, a device policy manager and a battery, wherein the USB-PD port is at least to deliver power via a USB cable to an external device and is coupled to the device policy manager and the battery; and
    the USB-PD port further comprising a policy engine to control a state the USB-PD port is in and to control the delivery of power, wherein the policy engine, when the USB-PD port is in an unpowered state, is to determine whether the USB-PD port is ready to power the USB cable, and based on the determination that the USB-PD port is ready to power the USB cable, the policy engine is to transition the USB port into a check internal power state.

2. The system of claim 1, wherein the policy engine, when the USB-PD port is in the unpowered state, is to determine whether there is a default voltage present on the USB cable imposed by the external device, and based on the determination that there is the default voltage present on the USB cable, the policy engine is to transition the USB-PD port into a check internal power state.

3. The system of claim 1, wherein the policy engine, when the USB-PD port is in the check internal power state, is to determine whether the USB-PD port is to be a consumer of power from the external device or be a provider of power to the external device.

4. The system of claim 3, wherein the policy engine, based on the USB-PD port is to be a consumer of power, transitions the USB-PD port to a sink port behavior state.

5. The system of claim 3, wherein the policy engine, based on the USB-PD port is to be a provider of power, transitions the USB-PD port to a default source port state.

6. The system of claim 3, wherein the policy engine, based on the USB-PD port neither being a source or a consumer, holds the USB-PD port in the check internal power state.

7. The system of claim 3, wherein the policy engine, based on the USB-PD port neither being a source or a consumer, transitions the USB-PD port to the unpowered state.

8. The system of claim 1, wherein the policy engine determines that a voltage on the USB cable has dropped below a threshold voltage and determines that the USB-PD port is unable to operate, and, based on those determinations, transitions the USB-PD port into the unpowered port state.

9. The system of claim 1, wherein the device policy manager informs the policy engine that the USB-PD port is ready to power the USB cable.

10. The system of claim 1, wherein the device policy manager informs the policy engine what voltage to deliver to an external device via the USB cable.

* * * * *